Figure 5:
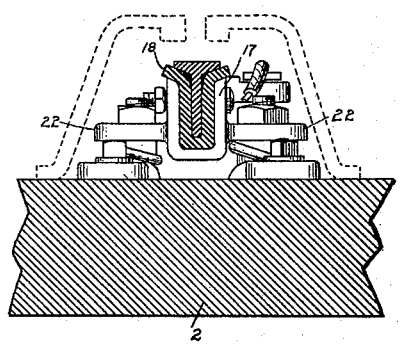

No. 612,644. Patented Oct. 18, 1898.
W. GRUNOW, JR.
DEPRESSIBLE RAIL SYSTEM FOR ELECTRICAL RAILWAYS.
(Application filed July 10, 1897.)
(No Model.) 6 Sheets—Sheet I.
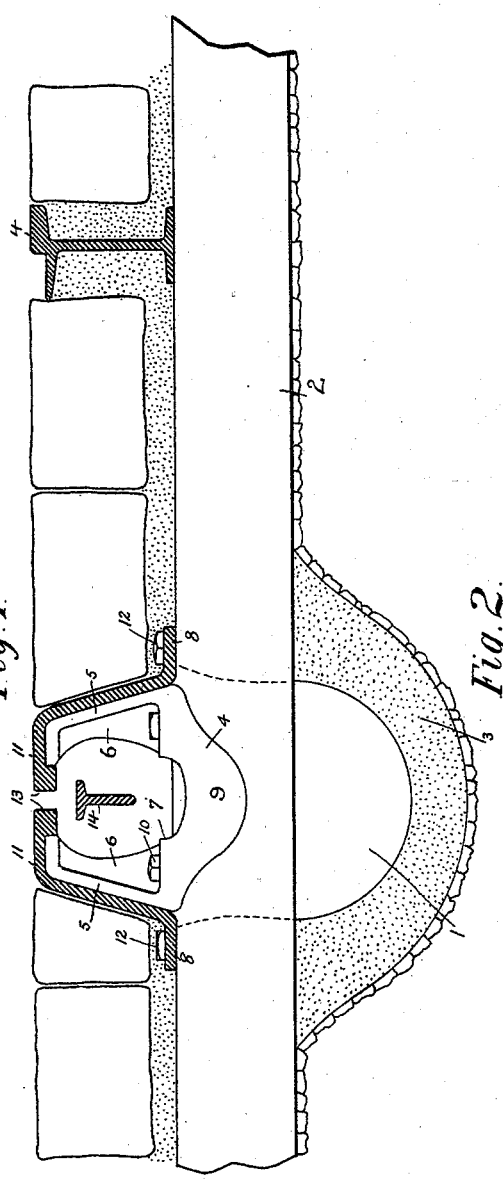
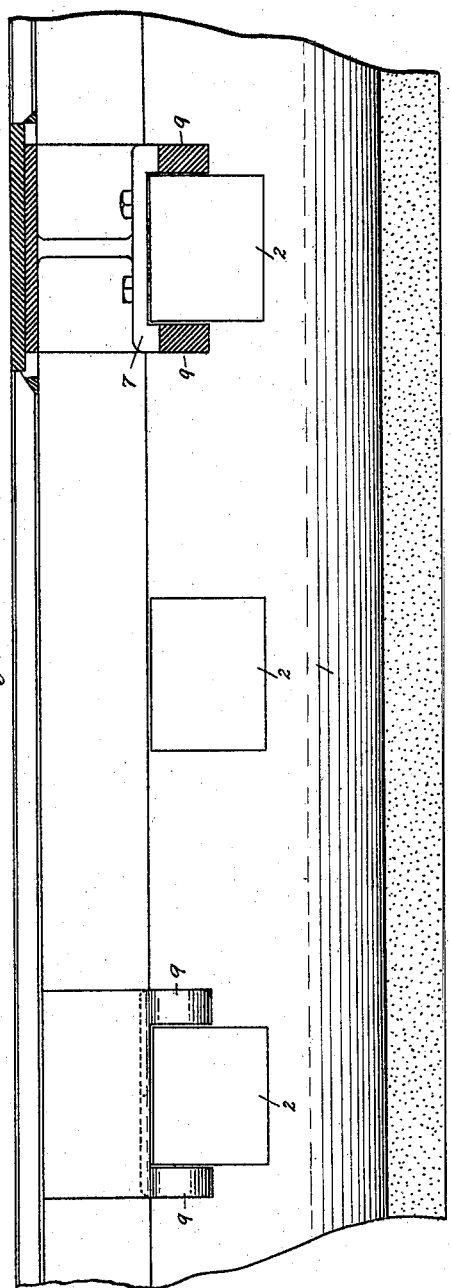
WITNESSES:
INVENTOR
BY
ATTORNEY No. 612,644. Patented Oct. 18, 1898.
W. GRUNOW, Jr.
DEPRESSIBLE RAIL SYSTEM FOR ELECTRICAL RAILWAYS.
(Application filed July 10, 1897.)
(No Model.) 6 Sheets—Sheet 2.

WITNESSES:
Norris A. Clark.
M. McCabe

INVENTOR
William Grunow Jr.
BY
Charles S. Rogers
ATTORNEY

THE NORRIS PETERS CO., PHOTO-LITHO., WASHINGTON, D. C.

No. 612,644. Patented Oct. 18, 1898.
W. GRUNOW, Jr.
DEPRESSIBLE RAIL SYSTEM FOR ELECTRICAL RAILWAYS.
(Application filed July 10, 1897.)
(No Model.) 6 Sheets—Sheet 3.

WITNESSES:
Norris A. Clark.
M. McCabe

INVENTOR
William Grunow Jr.
BY
Charles S. Rogers
ATTORNEY

No. 612,644. Patented Oct. 18, 1898.
W. GRUNOW, Jr.
DEPRESSIBLE RAIL SYSTEM FOR ELECTRICAL RAILWAYS.
(Application filed July 10, 1897.)
(No Model.) 6 Sheets—Sheet 4.
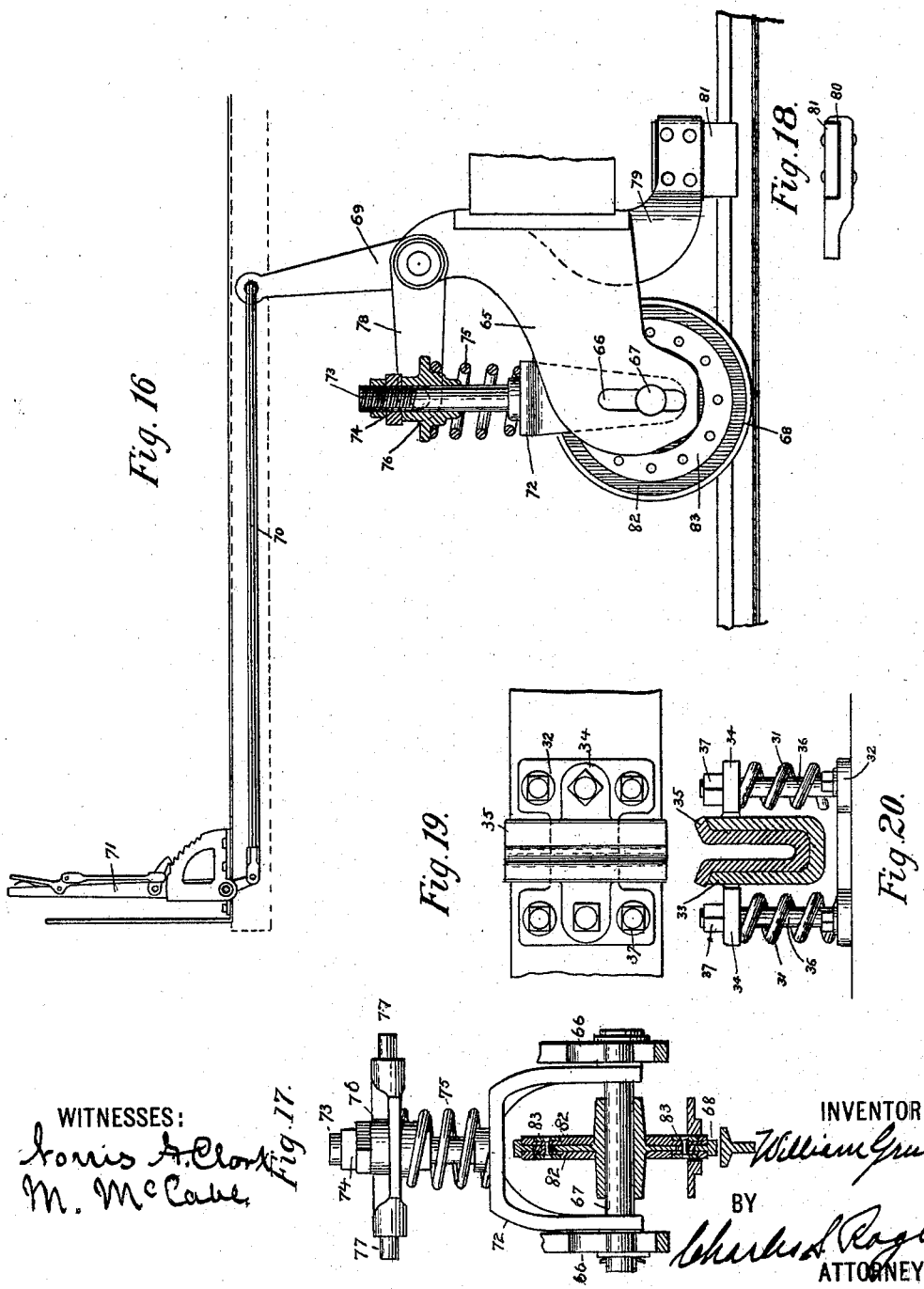
WITNESSES:
INVENTOR
BY
ATTORNEY No. 612,644. Patented Oct. 18, 1898.
W. GRUNOW, Jr.
DEPRESSIBLE RAIL SYSTEM FOR ELECTRICAL RAILWAYS.
(Application filed July 10, 1897.)
(No Model.) 6 Sheets—Sheet 5.
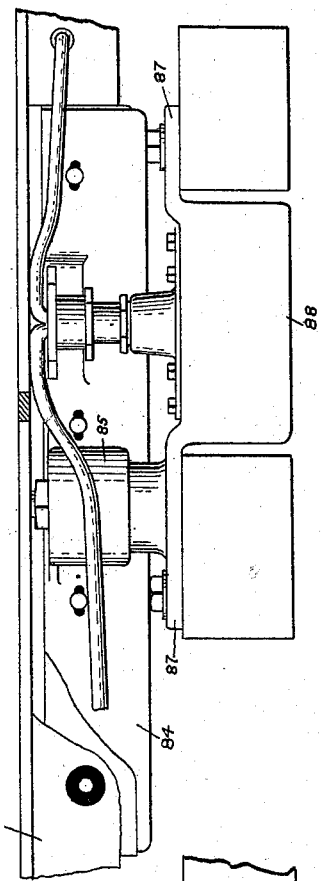
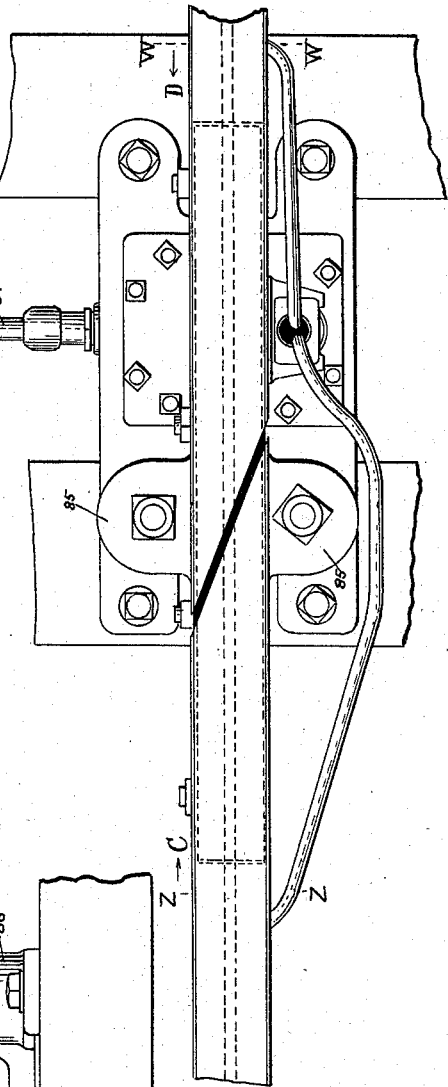
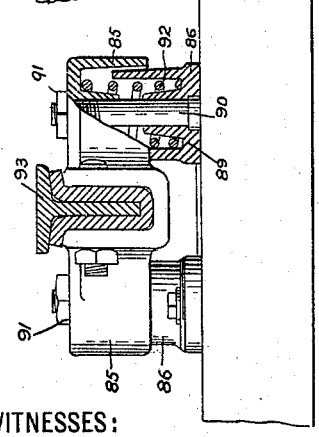
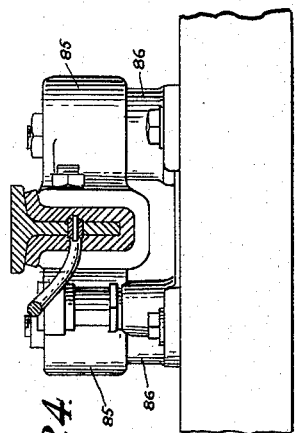
WITNESSES: INVENTOR
BY
ATTORNEY No. 612,644. Patented Oct. 18, 1898.
W. GRUNOW, Jr.
DEPRESSIBLE RAIL SYSTEM FOR ELECTRICAL RAILWAYS.
(Application filed July 10, 1897.)
(No Model.) 6 Sheets—Sheet 6.
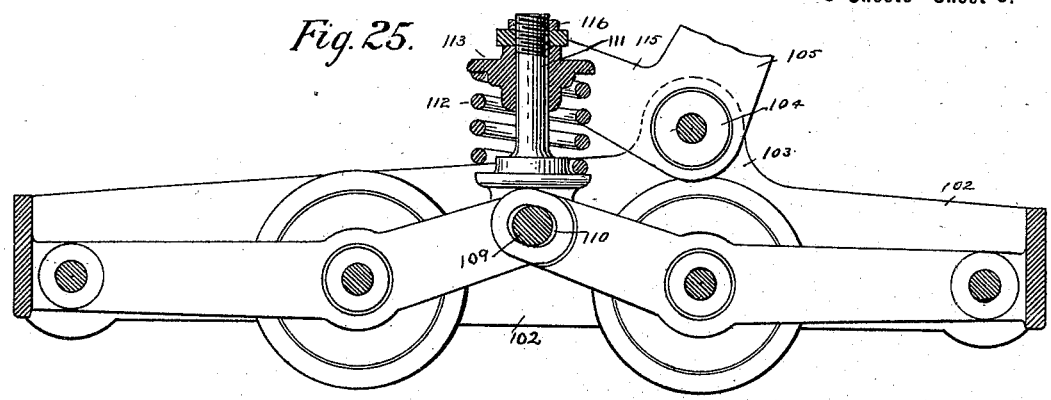
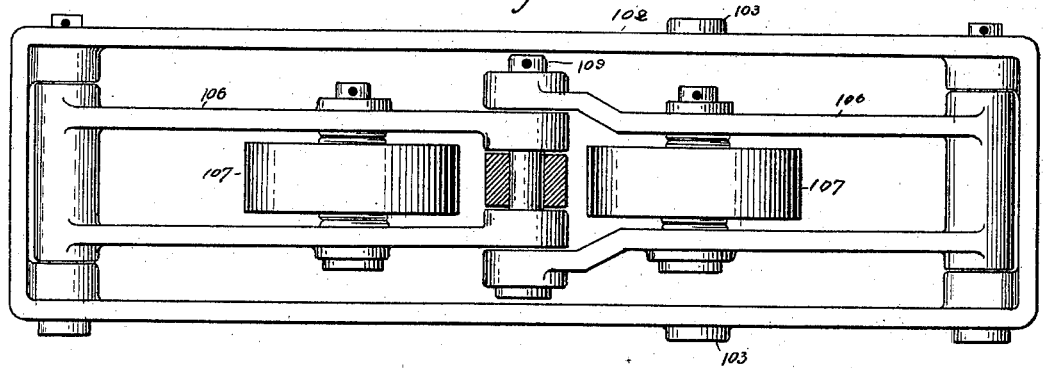
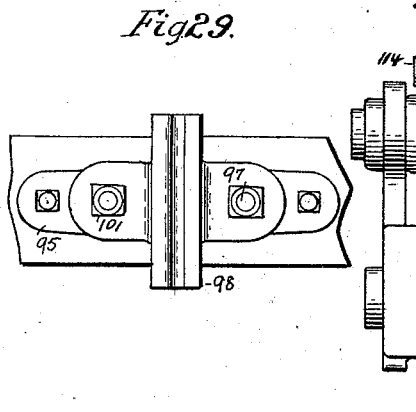
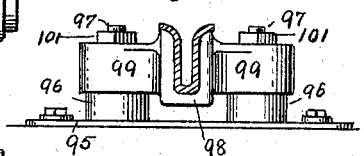
WITNESSES:
Norris A. Clark.
M. McCabe.
INVENTOR
William Grunow Jr
BY
Charles A. Rogers
ATTORNEY

UNITED STATES PATENT OFFICE.

WILLIAM GRUNOW, JR., OF BRIDGEPORT, CONNECTICUT, ASSIGNOR OF ONE-HALF TO ZALMON GOODSELL, OF SAME PLACE.

DEPRESSIBLE-RAIL SYSTEM FOR ELECTRICAL RAILWAYS.

SPECIFICATION forming part of Letters Patent No. 612,644, dated October 18, 1898.

Application filed July 10, 1897. Serial No. 644,080. (No model.)

*To all whom it may concern:*

Be it known that I, WILLIAM GRUNOW, Jr., a citizen of the United States, residing at Bridgeport, in the county of Fairfield and State of Connecticut, have invented certain new and useful Improvements in Depressible-Rail Systems for Electrical Railways; and I do hereby declare the following to be a full, clear, and exact description of the invention, such as will enable others skilled in the art to which it appertains to make and use the same.

This invention relates to electrical railways, and particularly to that class in which a depressible rail is employed to close the circuit; and some of the objects of the invention are to provide a system of this character which will be simple and cheap in construction and in which the action will be positive and effective and which can be applied to trolley and cable roads now in use at a small expenditure of labor or money, and this system is also designed for use on steam-roads, and in this case the conduit is necessarily dispensed with, but the system is not otherwise changed.

In this system is employed a depressible rail or service-conductor composed of insulated sections connected by a support which is mounted on springs or similar devices, and directly beneath each support is located a contact-receptacle containing a feeder-terminal suitably connected with the source of electrical supply, and movably mounted within the contact-receptacle is a contact device having electrical connection with the extremity of each of the insulated sections of the depressible rail or service-conductor, and this contact device by suitable means is caused to move with the depressible rail, so that when the rail is depressed the contact device will be forced into contact with the feeder-terminal, thereby closing the electrical circuit and charging the depressible rail or service-conductor, which is forced downwardly against the action of the supporting means by suitable contact-wheels or similar devices upon the car-trucks.

With these and other objects in view the invention consists, substantially, in the construction, combination, and arrangement of parts hereinafter more fully described in the specification and illustrated in the accompanying drawings, in which—

Figure 6:
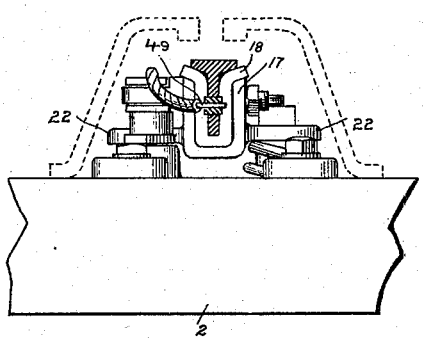
Figure 3:
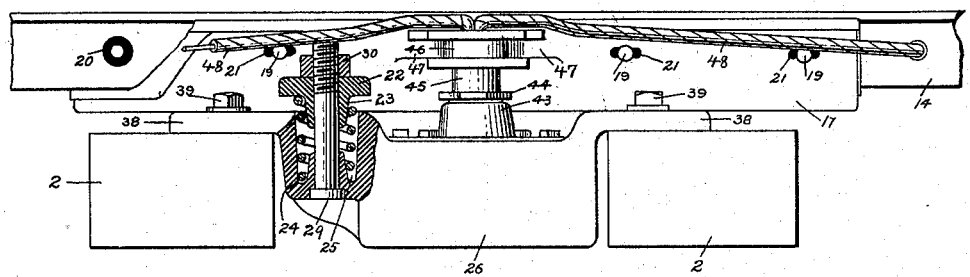
Figure 4:
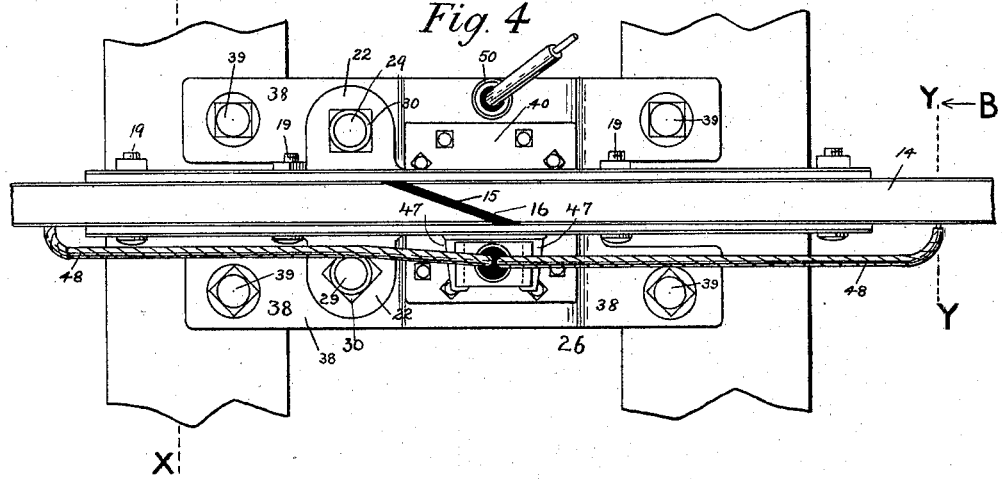
Figure 7:
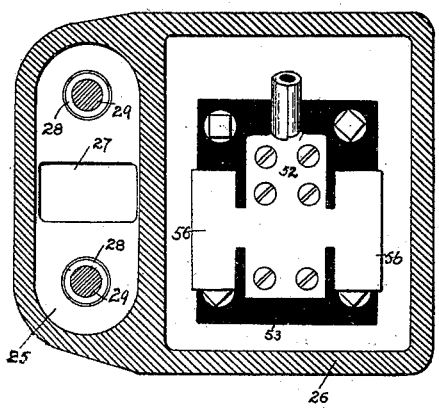
Figure 8:
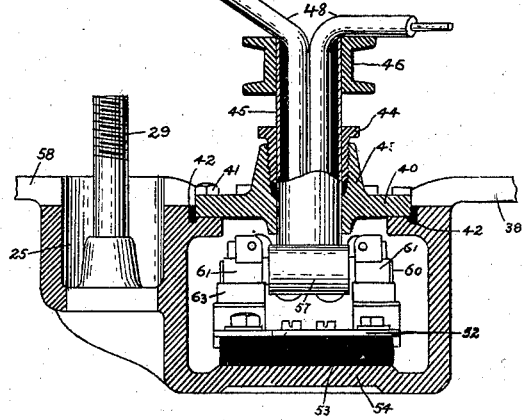
Figure 9:
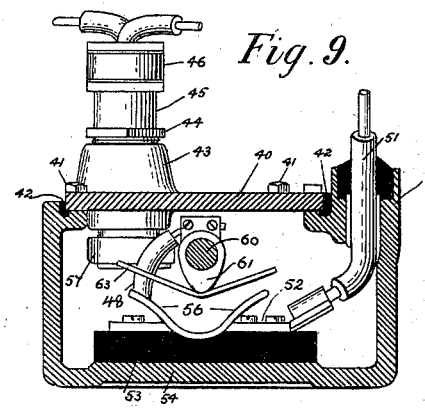
Figure 10:
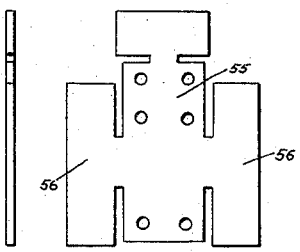
Figure 12:
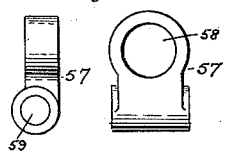
Figure 14:
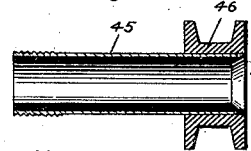
Figure 11:
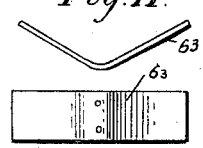
Figure 15:
Figure 13:

Figure 1 is a cross-section of the road-bed, showing parts of the construction in elevation. Fig. 2 is a central longitudinal section of the road-bed. Fig. 3 is a side elevation, partly in section, of the depressible rail and contact-receptacle, showing the same in position, a portion of the rail-support being broken away. Fig. 4 is a plan view of the construction shown in Fig. 3. Fig. 5 is a cross-section of the depressible rail and its support, taken on line $x\ x$ of Fig. 4, looking in direction of the arrow A. Fig. 6 is a similar section on line $y\ y$ of Fig. 4, looking in the direction of arrow B, showing the insulated conductor connected to the rail. Fig. 7 is a horizontal section of the contact-receptacle, showing the feeder-terminal in the bottom thereof. Fig. 8 is a vertical longitudinal section of the contact-receptacle, parts being shown in elevation. Fig. 9 is a vertical cross-section of the contact-receptacle, parts being shown in elevation. Fig. 10 is a plan and edge view, respectively, of the feeder-terminal. Fig. 11 shows detail views of a portion of the contact device. Fig. 12 shows detail views of the tube and bar connection. Fig. 13 illustrates detail views of the connector. Fig. 14 is a longitudinal section of the insulator-tube. Fig. 15 illustrates detail views of the insulator-bar. Fig. 16 is a side elevation, partly in section, of the depressing device and the operating means for the same. Fig. 17 is an end view, partly in section and partly in elevation, of the depressing device in operative position. Fig. 18 is a detail view of the scraper. Figs. 19 and 20 are plan and elevational views, respectively, of the intermediate spring-support for the depressible rail. Fig. 21 is a side elevation, partly broken away, of a modified form of the construction shown in Fig. 3 adapted for use on steam-roads. Fig. 22 is a top plan view of the same. Fig. 23 is a cross-section of the depressible rail, taken on line $z\ z$ of Fig. 22, looking in direction of the arrow C. Fig. 24 is a similar view taken on line $w\ w$ of Fig. 22, looking in direction of arrow D. Fig. 25 is a longitudinal central vertical section of a modified form of depressing device, parts being shown in elevation. Fig. 26 is a top plan view of the same. Fig. 27 is an end view thereof. Fig. 28 is an end elevation of a modified form of intermediate spring-support for the depressible rail. Fig. 29 is a top plan view of the same.

Similar characters of reference designate like parts throughout the several views.

Referring to the drawings, and particularly to the construction shown in Figs. 1 and 2 thereof, the numeral 1 indicates a continuous excavation or trench formed before or after the beams 2 are laid in position, and the trench may have a bottom of broken stone or gravel, as shown in Fig. 1, over which may be placed a layer of concrete, brick tiling, or similar material 3, which may surround or in which may be embedded the beams 2, and the concrete may be brought around the lower portion of the track-rails 4, and, if desired, the concrete or similar material may form the foundation for the Belgian paving-blocks or asphaltum, as the demand may require, and the exposed portions of the beams 2 may be coated with preservative paint.

The trench or subway should be provided with suitable sewer connections whenever necessary—as, for instance, at the foot of grades and occasionally on levels—and it may be of any preferred form or construction. A cable or an underground electrical conduit may be used with but slight alteration.

Upon the beams 2 are secured, at predetermined intervals, by means of bolts or otherwise, cast-iron yokes 4, having upwardly-directed curved arms or members 5, from the central portion of which project segmental ribs 6, and the base 7 is preferably slightly wider than the beams, to which it is secured by bolts or spikes 10, and is provided with depending segmental flanges 9, adapted to partially inclose the sides of the beams and afford greater rigidity to the yokes 4, as shown in Figs. 1 and 2 of the drawings.

The yokes 4 serve to support the slot-rails 11, having attaching-flanges 8, by means of which they are secured in position upon the beams 2 and the yokes 4 by bolts or spikes 12, and these slot-rails are made to conform to the exterior formation of the yokes 4 and are provided along the free edge thereof with a depending engaging rib 13, adapted to overlap the free edge of the yokes 4, as shown, and by means of this construction they are retained in the proper position and alinement throughout the varying conditions of the seasons.

From the foregoing it will be seen that this system is not expensive to construct and lay out and that any of the present road-beds substantially ballasted and using the overhead trolley-wire can be converted into this system without the removal of the tracks or ties.

The depressible rail 14, which may be of any suitable cross-section, is preferably divided into sections of suitable length, and the ends of these sections may be cut obliquely or beveled, as shown at 15, Fig. 4, to allow for the expansion and contraction without injury to the same, also to permit the contact-wheel before leaving one section to have entered upon the next, and these sections are preferably separated from each other by insulation 16, Fig. 4, so that only the section under the car and the one immediately ahead of it are charged or enlivened, the rail being normally "dead."

The ends of the rail-sections are retained in position by the U-shaped rail-support 17, which is separated from the rail-sections by suitable insulation 18, and the ends of the rail-sections are secured in position within the support by bolts 19, provided with insulated bushings 20, Fig. 3, passing through slots 21, formed in the support to provide for the expansion and contraction of the parts, and by this means the sections constitute practically one continuous depressible rail.

The rail-support is provided with two laterally-extending lugs or lips 22, with depending tubular portions 23, the lugs being adapted to rest upon spiral or other springs 24, mounted in the spring-compartment 25 of the contact-receptacle 26, and this compartment extends entirely across one end of the contact-receptacle, having a central opening 27 in the bottom thereof, as shown in Figs. 7 and 8, for the escape of moisture, and also openings 28, through which the guide bolts or pins 29 pass, and these bolts or pins extend through the springs 24 and the lugs 22 upon the rail-support 17 and are secured in position by means of suitable nuts 30, which also serve to increase the tension of the springs 24, if desirable.

The depressible rail or service-conductor may be provided in the case of very long sections with intermediate supporting-springs 31, Figs. 19 and 20, mounted on a base 32, suitably secured to the beams, and upon these springs rests the rail-support 33, provided with laterally-extending apertured lugs 34, the support 33 being separated from the depressible rail or service-conductor 14 by insulation 35, said springs and support being held in position by means of bolts or pins 36, provided with securing-nuts 37, as clearly shown in Figs. 19 and 20 of the drawings.

By means of the construction before described the depressible rail or service-conductor can be made to withstand any desired amount of pressure and the rail will be retained and caused to move only in a vertical plane and will not be deflected under pressure.

The contact-receptacle 26, Figs. 3, 4, and 9, of any suitable material, is preferably provided with flanges 38, which rest upon the beams between which the contact-receptacles are supported, and these flanges are secured in position upon the beams by bolts or spikes 39, and the contact-receptacle is provided with a cover 40, secured thereto by screws or bolts within a depression 42 in the upper portion of the receptacle, and in one side of the cover 40 is formed or secured a tubular portion 43, in which is mounted a stuffing-box 44, and movably mounted within the tubular portion 43 and within the stuffing-box 44 is an iron-armored insulating-tube 45, Figs. 3, 8, 9, and 14, carrying at the upper end thereof a recessed nut 46, adapted to receive the segmental lugs 47 upon the rail-support 17, Figs. 3 and 4, whereby the tube 45 is caused to move vertically by the depression or elevation of the depressible rail or service-conductor.

Separate insulated conductors 48 are connected at one extremity to the ends of the sections of the depressible rail or service-conductor 14 on each side of the contact-receptacle 26, as shown at 49, Fig. 6, and the free extremities of the conductors 48 are passed into the contact-receptacles 26 through the tube 45, which is afterward sealed with an asphalt compound, as well as the recess about the cover 40 of the receptacle 26, thus securing a water-tight inclosure.

The contact-receptacle 26 is provided at one side thereof beyond the edge of the cover 40 with a vertical tubular projection 50, Figs. 4 and 9, through which the lead-covered feeder-cable or supply-conductor 51 enters the contact-receptacle 26, and the orifice of the projection 50 is then filled with asphalt compound, thus securing a water-tight connection, and the extremity of the feeder-cable or supply-conductor 51 is then suitably attached to the lower or feeder terminal 52, Figs. 7, 8, 9, and 10, secured by screws or other means upon the insulating-block 53, attached by bolts or screws upon the central elevated portion 54 of the bottom of the receptacle 26, and this lower or feeder terminal 52 is preferably formed or stamped from sheet metal, as shown in Figs. 7 and 10, having a central or body portion 55, through which attaching screws or bolts pass to secure it in position and from which project lateral parallel wings or members 56, the extremities whereof are bent upwardly or V-shaped, as shown in Figs. 8 and 9.

To the lower end of the insulator-tube 45 is suitably connected the tube and bar connection 57, Figs. 8, 9, and 12, which is provided with an opening 58 to receive the lower end of the insulator-tube 45 and be retained thereon preferably by screw-threaded connection therewith, and also with a tubular extension 59, extending at right angles to the main portion of the connection and adapted to receive an insulator-bar 60, Figs. 8, 9, and 15, having a core consisting of a steel rod to stiffen the same, and upon the extremities of this bar 60 are suitably secured connectors 61, Figs. 8, 9, and 13, having each an opening therein, whereby it is secured on the extremity of the bar 60, and these connectors 61 are provided with ears or clamps 62, adapted to receive the extremities of the insulated conductors 48, the outer extremities whereof are connected with the ends of the rail-sections 14, as before described, and to the pointed edge of the connectors 61 are suitably secured spring contact-plates 63, Figs. 8, 9, and 11, preferably of the construction shown, which are adapted to enter and contact with the V-shaped lower or feeder terminals 52 when the rail is depressed.

From the foregoing description it will be understood that the feeder-cable or supply-conductor 51 enters the contact-receptacle 26 through the tubular projection 50, and the extremity thereof is connected with the lower or feeder terminal 52, having V-shaped wings 56, and the insulated conductors 48 are connected at one of their ends to the rail-sections 14, and the other ends pass through the insulator-tube 45 and are connected to the connectors 61, carrying the spring contact-plates 63, so that when the rail is depressed the insulator-tube is carried downwardly therewith and the contact-plates 63 are forced into contact with the V-shaped members of the lower or feeder terminal 52, thus closing the circuit and charging both depressible rail or service-conductor sections simultaneously; also, the depressing device when approaching a contact-receptacle will charge the succeeding rail-section before it has entered upon it, thus preventing any "arcing" within the contact-receptacle, as well as at the ends of the rail-sections.

Each contact-receptacle may be opened for inspection without disturbing the rail-sections, and each rail-section, rail-support, or spring can be replaced without interfering with the contact-receptacle, the whole being constructed so that each part may be independent of the other.

The depressing means carried by the car for operating the depressible rail or service-conductor consists of a supporting-frame 65, of cast-steel or suitable material, adapted to be attached to the car-truck, although insulated from it, and in the bifurcated portion of the frame is formed a vertical slot 66, in which the extremities of the axle 67 of the contact-wheel 68 are movably mounted, being secured in position therein by a nut or pin, and in the upper portion of the frame 65 is pivotally mounted a bell-crank lever 69, to the vertical arm of which is connected one end of a pull-rod 70, the free end of said rod being connected to a ratchet-lever 71, suitably mounted upon the platform of the car, whereby the pressure exerted by the contact-wheel 68 upon the depressible rail or service-conductor can be regulated as desired, and the axle of the contact-wheel is journaled in bearings formed in the bifurcated arm 72, within which said wheel revolves, and from the upper central portion of said arm projects a vertical guide-rod 73, carrying an adjusting-nut 74 to regulate the force of the spring 75, mounted on the guide-rod 73 and held in position therein by a guide-sleeve 76, having oppositely-directed trunnions 77, which enter openings in the extremities of the bifurcated arm 78 of the bell-crank lever 69.

Projecting from the supporting-frame 65 is a scraper-arm 79, the free end of which is provided with a recess 80, adapted to receive the scraper 81, suitably secured therein and insulated from the scraper-arm, as shown in Fig. 18, and this scraper is adapted to clear the slot in advance of the contact-wheel 68 and to protect said wheel from injury, and this scraper, which is detachable from the arm 79, also serves as a guide to the wheel, relieving the sides from strain and wear within the slot.

The sides of the contact-wheel, which are preferably recessed, as shown in Fig. 17, are covered with insulating-plates 82, which are protected from injury and wear by steel guard-plates 83.

Two separate contact-wheels should be employed to a car, one to each truck, and in the case of one truck then a contact-wheel should be mounted close to each motor. They should be directly connected and operated simultaneously.

The present cars, trucks, controllers, and motors may be employed in connection with this system without change and all parts pertaining to this system can be readily obtained in the open market, except the contact-receptacles and the contact-wheels.

In Figs. 21 to 29 is illustrated a modified form of the construction heretofore described and shown particularly adapted for use on steam-roads, and the construction shown in Figs. 21 to 24 is the same as that heretofore described and illustrated in Figs. 3 to 6, with the exception that the spring-compartment 25 of the contact-receptacles 26 is dispensed with and the beams are brought close to the contact-receptacles, and the rail-support has depending tubular projections 85 extending laterally therefrom, which inclose the upper portions of the tubular receptacles 86, projecting upwardly from a base-plate upon the flanges 87 of the contact-receptacles 88, and these tubular receptacles 86 are provided with an interior tubular extension 89, in which are secured guide-rods 90, adapted to connect and retain in position the tubular projections 85 and the tubular receptacles 86 by means of the adjusting-nuts 91 upon the screw-threaded ends thereof, and around these rods 90 are the springs 92, which support the depressible rail 93, and by means of this construction the springs will be protected from snow and ice and no lateral movement of the depressible rail or service-conductor will be occasioned when under pressure. The contact-receptacles 88 are of the same construction as that heretofore described, with the exception above stated, and it will be unnecessary to describe the same further than to say that the feeder-cable or supply-conductor 94 is led into the contact-receptacle, at one side thereof, through a suitable plug or bushing, as shown in Fig. 22.

The intermediate spring-supports for the depressible rail (shown in Figs. 28 and 29) consist of a base 95 to be bolted or spiked to the beams, from which project two tubular receptacles 96, through which pass guide-rods 97, and the rail-support 98, insulated from the rail, is provided with depending tubular projections 99, adapted to rest upon the springs located about the rods 97 and to be retained in position by the adjusting-nuts 101 upon said rods 97, as before described.

The depressing means consists of a rectangular frame 102, of cast-steel or other material, having vertically-extending apertured ears or lugs 103, connected by a transverse shaft 104, on which is mounted a bell-crank lever 105, the vertical arm thereof being connected to one end of a pull-rod, (not shown,) the free end of said rod being pivotally connected with a ratchet-lever, (not shown,) as before described, and yokes 106 pivotally mounted in the ends of frame 102 and having contact-wheels 107 mounted therein, about midway of the length thereof, and the free ends of said yokes are pivotally connected by a transverse rod 109, adapted to move in the longitudinal slots 110 in said ends. Upon the rod 109 is mounted a guide-rod 111, carrying a spring 112, held in position thereon by a sliding sleeve 113, provided with laterally-extending trunnions 114, which enter openings in the bifurcated arm 115 of the bell-crank lever 105, and the sleeve 113 is prevented from disengagement with said guide-rods 114 by an adjusting-nut 116, so that when the ratchet-lever 107 is operated the contact-wheels will be forced upon the depressible rail, as heretofore explained.

I do not desire to confine myself to the construction herein shown and described, and various changes in and modifications of the same may be made without departing from the spirit and scope of this invention.

This system may be applied to existing roads having substantially ballasted road-beds, it being understood that the subway electric or cable conduits may be utilized with but slight change.

Having accurately described my invention, what I claim as new, and desire to secure by Letters Patent, is—

1. A subway consisting of a conduit, beams extending across the conduit, yokes upon the beams provided with curved arms, and slot-rails inclosing the yokes and provided with an attaching-flange along one edge thereof and having an engaging rib along the free edge thereof to overlap the extremities of the yoke-arms and form a slot.

2. A subway consisting of a conduit, beams bridging the conduit, yokes secured upon the beams and provided with clamping-jaws extending downwardly upon each side of the beams, and having curved upwardly-extending arms, and slot-rails inclosing the yokes and provided with an attaching-flange along one edge thereof to be connected to said beams and having an engaging rib along the free edge of the same to overlap the extremities of the yoke-arms and form a slot.

3. In an electric-railway system, contact-receptacles, a feeder-cable passing into the receptacles, a supporting connection or joint overlapping the end portions of a service-conductor provided with means to close the circuit and charge the service-conductor.

4. In an electric-railway system, contact-receptacles, a feeder-cable passing into said receptacles provided with a terminal, a supporting connection or joint overlapping the end portions of the service-conductor and means carried by said joint to close the circuit through the terminal and charge the service-conductor.

5. In an electric-railway system contact-receptacles, a feeder-cable passing into said receptacles, provided with a terminal, a depressible supporting connection or joint overlapping the end portions of the service-conductor and means carried by said joint to close the circuit through said terminal and charge the service-conductor.

6. In an electric-railway system contact-receptacles, a feeder-cable passing into said receptacles provided with a terminal, a depressible supporting connection or joint overlapping the end portions of the service-conductor mounted above said receptacles and means carried by said joint to close the circuit through said terminal and charge the service-conductor.

7. In an electric-railway system, contact-receptacles, a feeder-cable passing into said receptacles and provided with a terminal, a supporting connection or joint for the end portions of the service-conductor, mounted upon springs adjacent to the receptacles and a separate contact device carried by said joint to charge the service-conductor through said terminal.

8. In an electric-railway system, contact-receptacles, a feeder-cable passing into said receptacles and provided with a terminal, a supporting connection or joint for the end portions of the sectional service-conductor provided with lateral lugs, springs supporting said lugs and a separate contact device carried by said joint adapted to contact with said terminal and charge the service-conductor.

9. In an electric-railway system contact-receptacles, a feeder-cable passing into said receptacles and having a feeder-terminal, a support provided with lateral lugs mounted above the receptacles, springs supporting said lugs, a service-conductor upon the support and a contact device carried by lugs upon the support to charge the service-conductor when the support is depressed.

10. In an electric-railway system, contact-receptacles, provided with spring-compartments and with a tubular projection, a feeder-cable passing into the receptacles and having a terminal, a supporting connection or joint for the ends of the sections of the service-conductor, having laterally-extending lugs, springs in said spring-compartments and supporting said lugs, guides for the lugs and springs, a sleeve movably mounted in said projection and supported by lugs on the support, a service-conductor upon the support, a contact carried by the sleeve and electrical connection between the contact and service-conductor.

11. In an electric-railway system contact-receptacles having a tubular projection, a feeder-cable passing into the receptacles and having a feeder-terminal, a support carrying a service-conductor, a sleeve movably mounted within the tubular projection and having a recessed nut engaging lugs on the support, a contact carried by the sleeve and connections between the same and the service-conductor.

12. In an electric-railway system, contact-receptacles, a sheet-metal feeder-terminal provided with V-shaped lateral wings or members secured upon an insulating-block in said receptacles, a feeder-cable passing into the receptacles and connected to said terminal, a depressible support adjacent to the receptacles, a service-conductor upon said support, a sleeve movably mounted in said receptacles and connected with said support, spring contact-plates carried by said sleeve and electrical connections between the same and the service-conductor.

13. In an electric-railway system contact-receptacles, provided with a terminal having V-shaped members, a feeder-cable passing into said receptacles and having connections with said terminal, a depressible support mounted adjacent to receptacles, a sleeve carried by said support and provided with spring contact-plates adapted to contact with said members of the terminal when the support is depressed, a sectional service-conductor upon said support and separate electrical connections between each section of said conductor and said contact-plates to simultaneously charge both sections.

14. In an electric railway contact-receptacles, provided with tubular receptacles, a depressible U-shaped support mounted adjacent to the receptacles and having depending tubular projections adapted to enter said receptacles, springs within said receptacles and extending into the projections, and guide-bolts passing through the base of the receptacles, the springs and the support and limiting the movement of the latter, a feeder-cable passing into said receptacles and having a terminal, a service-conductor upon said support and a contact device carried by the support and having electrical connections with the service-conductor.

15. A support for electrical service-conductors consisting of a base, a U-shaped support having laterally-extending lugs, springs between the base and lugs and guide pins or bolts extending through the base, springs and lugs and limiting the movement of the latter.

16. A support for electrical service-conductors provided with a base having tubular receptacles, a U-shaped support having depending tubular projections adapted to enter said receptacles, springs within the receptacles and extending into the projections and guide pins or bolts passing through the base, springs and support.

17. A depressing device provided with a frame adapted to be secured to the car-truck, a current-collecting device movably mounted within said frame, a guide-rod carried by said current-collecting device, a spring-supported sleeve movably mounted upon the guide-rod and having outwardly-directed trunnions, a bell-crank lever pivoted in the upper portion of said frame and provided with a bifurcated arm adapted to engage said trunnions and means for operating the upper arm of the bell-crank lever to depress the current-collecting device.

18. A depressing device provided with a frame adapted to be secured to a car-truck, an arm movably mounted within the frame, a wheel journaled in said arm, a guide-rod connected with said arm, a spring-supported sleeve movably mounted upon said guide-rod and having outwardly-directed trunnions, a bell-crank lever pivoted in the upper portion of said frame and having a bifurcated lower arm adapted to rest upon said trunnions and means for actuating the upper arm of said bell-crank lever to depress said wheel.

19. A depressing device provided with a frame having a bifurcated portion with vertical slots and having a scraper, a bifurcated arm having a guide-rod, a wheel journaled in said bifurcated arm and having axles engaging said slots, a bell-crank lever pivoted to said frame, a spring-supported sleeve movably mounted upon said guide-rod and provided with trunnions to receive the lower arm of said bell-crank lever and means for actuating the upper arm of said bell-crank lever to depress said wheel.

In testimony whereof I affix my signature in presence of two witnesses.

WILLIAM GRUNOW, JR.

Witnesses:
H. F. NORCROSS,
CHARLES KELSEY.